United States Patent [19]

Kawai et al.

[11] Patent Number: 4,856,292
[45] Date of Patent: Aug. 15, 1989

[54] PRESSURE CONTROL VALVE ASSEMBLY

[75] Inventors: Katsunori Kawai; Shinichi Suzuki; Mitsuhiro Hattori; Hiroyuki Deguchi, all of Kariya, Japan

[73] Assignee: Kabushiki Kaisha Toyoda Jidoshokki Seisakusho, Kariya, Japan

[21] Appl. No.: 136,107

[22] Filed: Dec. 21, 1987

[30] Foreign Application Priority Data

Dec. 27, 1986 [JP] Japan .................... 61-201054[U]

[51] Int. Cl.⁴ ............................................ F25B 1/00
[52] U.S. Cl. .................................. 62/217; 137/494; 137/625.3; 137/625.38
[58] Field of Search .............. 62/217; 137/494, 625.3, 137/625.38, 625.39

[56] References Cited

U.S. PATENT DOCUMENTS

| 2,556,308 | 6/1951 | Weatherhead | 137/625.3 |
| 3,776,278 | 12/1973 | Allen | 137/625.38 |
| 4,669,272 | 6/1987 | Kawai et al. | 621/217 |
| 4,691,526 | 9/1987 | Kobayashi et al. | 621/217 |
| 4,709,555 | 12/1987 | Kawai et al. | 62/217 |

FOREIGN PATENT DOCUMENTS 547104 8/1942 United Kingdom .......... 137/625.39

Primary Examiner—Robert G. Nilson
Attorney, Agent, or Firm—Brooks Haidt Haffner & Delahunty

[57] ABSTRACT

In the pressure control valve assembly according to the present invention, a plurality of communication passages or slits is formed in either the movable throttling plunger or its associated stationary seat portion, and such passages are so arranged that their effective communication area is variable with the plunger movement relative to the seat portion in the region where the plunger is positioned close to its full-throttling position, whereby throttling of the refrigerant gas in such a region is achieved through the effective communication area of these passages.

6 Claims, 9 Drawing Sheets (PRIOR ART)

(PRIOR ART)

PRESSURE CONTROL VALVE ASSEMBLY

FIELD OF THE INVENTION

The present invention relates generally to a pressure control valve. More specifically, it relates to a valve assembly disposed between the evaporator and the compressor in an automotive air conditioning system for controlling the pressure of refrigerant gas issuing from the evaporator.

BACKGROUND OF THE INVENTION

For the sake of better understanding of a prior art pressure control valve to which the present invention pertains, reference is had to FIGS. 17 through 21 of the drawings accompanying herewith.

FIG. 17 exemplifies an air conditioning system which includes an evaporator 3 connected at its inlet to a receiver 1 by way of an expansion valve 2 and at the outlet to the suction side of a refrigerant compressor 5 by way of an evaporator pressure control valve assembly 40, respectively. The discharge side of the compressor 5 is connected to a condenser 6 which is in turn connected to the receiver 1, thus forming a complete refrigeration circuit. The arrows in the diagram of FIG. 17 designate the direction in which the refrigerant flows in the system. If it were not for the pressure control valve assembly 40 in this system, the evaporator 3 itself would be cooled down to be frosted if the pressure at the outlet of the evaporator is kept at a low level. Thus, this control valve assembly 40 performs the function of controlling the refrigerant pressure at the outlet of the evaporator.

The pressure control valve assembly 40 has formed therein a passage A for allowing refrigerant gas evaporated from the evaporator 3 to pass therethrough toward the compressor 5. A movable valve spool or plunger 27 is slidably disposed, cooperating with its associated valve seat portion 8 to provide a variable throttling passage 13 for controlling the pressure of the refrigerant gas from the evaporator 3 in a known way. In the throttling passage 13, the end 27y of plunger 27 adjacent to the seat portion 8 forms substantially a right angle with a cylindrical sealing surface 8x of the seat portion. However, such pressure control valve assembly 40 poses a problem as will be described below.

FIGS. 18 and 19 show positions of the plunger 27 relative to the seat portion 8. FIG. 18 represents a wide-open position of the plunger 27; FIG. 19 shows a position thereof between the wide-open and closed or full-throttling positions. In these two drawings, $H_o$ and $H$ represent the distances of the end surface 27y of the plunger 27 as measured from the seat surface of the seat portion 8, respectively. Therefore, the position of the plunger 27 can be represented by H-to-$H_o$ ratio, or $H/H_o$.

The outer diameter of the plunger is represented by $D_7$ and the inner diameter of the cylindrical sealing surface 8x on the seat portion 8 is represented by $D_8$, respectively. Symbol L (FIG. 18) represents the shortest length or distance as measured between the end surface 27y of the plunger 27 and the seal surface 8x on the seat portion 8. With this information given, the area $S_o$ of the throttling passage 13 with the plunger 27 placed in its wide-open position and the area S of the throttling passage with the plunger moved away from its wide-open position and before the distance L becomes substantially zero can be expressed as $L(D_7+D_8)\pi/2$, respectively. It is noted that the dimension of the clearance between the sealing surface 8x and the periphery of the plunger end is shown somewhat exaggerated and that the amount of refrigerant gas allowed through this clearance is only to such an extent that lubricating oil mixed with the refrigerant may pass through this clearance for lubrication of the mating surfaces.

Reference is now made to the diagram of FIG. 20 showing the opening of the throttling passage 13 in terms of S-to-$S_o$ ratio (or $S/S_o$) varying with the movement or variable position of the plunger 27. When the plunger 27 moves from its wide-open position (FIG. 18) where $H/H_o$ is 1.0, to a position where $H/H_o$ is about 0.25, the opening of the throttling passage 13 ($S/S_o$) is decreased linearly as indicated by line "a" in the diagram of FIG. 20, which means that throttling effect occurs in a linear manner. In the movement of the plunger 27 from the above position (where $H/H_o$ is about 0.25) to its full-throttling position where the end surface 27y of the plunger is positioned very close to the seat surface of the seat portion 8, the throttling effect becomes substantially unchanged a indicated by line "e" of the same diagram.

Then, the variation of the cooling capacity with the varying plunger position ($H/H_o$) will be described with reference to FIG. 21. As shown in the diagram of the drawing, the cooling capacity, which is indicated by the ratio of the capacity Q for a given plunger position to the full capacity $Q_o$ obtainable when the plunger 27 is in its wide-open position (namely $Q/Q_o$, is reduced at a very rapid rate during the plunger movement from about 0.5 to about 0.3 of the ratio $S/S_o$. To describe the diagram of FIG. 21 in other words, the cooling capacity does not show a noticeable decrease until the plunger 27 is moved for a substantial distance to about 0.5 of the ratio $S/S_o$, but thereafter the capacity is decreased at a very rapid rate in a small range of plunger movement.

Consequently, the pressure $P_s$ of the refrigerant gas evaporating from the evaporator 3 in the passage A is caused to be changed rapidly by a slight movement of the plunger 27, thereby not only making it difficult to achieve stability in the controlling of the evaporating pressure of the refrigerant gas, but also causing chattering of the plunger 27.

Furthermore, in the range of plunger movement between the points about 0.5 and about 0.3, the cooling capacity will have to be controlled by only a slight movement of the plunger 27. This will make it difficult to achieve smooth controlling of the cooling capacity for moderate change in temperature and, therefore, the cooling comfort in the compartment to be cooled will be affected.

SUMMARY OF THE INVENTION

It is an object of the present invention to provide a pressure control valve assembly in an air conditioning system which can solve the above-identified problems.

In the pressure control valve assembly according to the present invention, a plurality of communication passages or slits is formed in either the movable throttling plunger or its associated stationary seat portion, and such passages are so arranged that their effective communication area is variable with the plunger movement relative to the seat portion in the region where the plunger is positioned close to its full-throttling position, whereby throttling of the refrigerant gas in such region is achieved through the effective communication area of these passages.

With the use of the valve assembly of the present invention, the amount of the refrigerant gas flowing through these passages can be changed at a moderate rate with the plunger movement relative to the seat portion and, therefore, the throttling of the refrigerant gas by the plunger movement can be achieved with smoothness. As a result, the cooling capacity can be controlled moderately and the afore-mentioned rapid change in evaporating pressure of the refrigerant gas acting o the plunger to cause chattering can be avoided successfully.

These and other objects, features and advantages of the invention will become apparent to those skilled in the art from the following description of a preferred embodiment of the pressure control valve assembly according to the present invention, which description is made with reference to the accompanying drawing.

DETAILED DESCRIPTION OF THE PREFERRED EMBODIMENT

Figure 1:
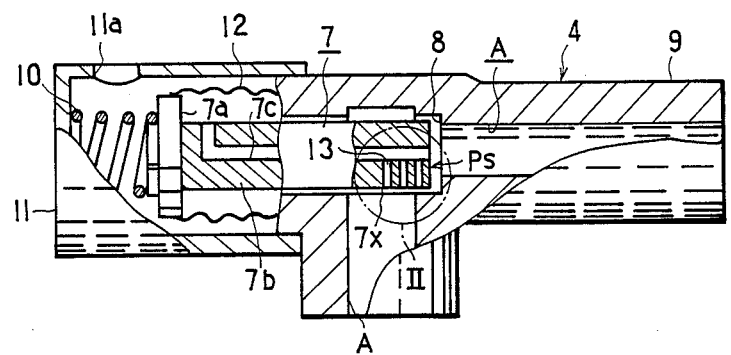
FIG. 1 is a longitudinal partial cross section of a pressure control valve assembly of the preferred embodiment in accordance with the present invention.
Figure 17:
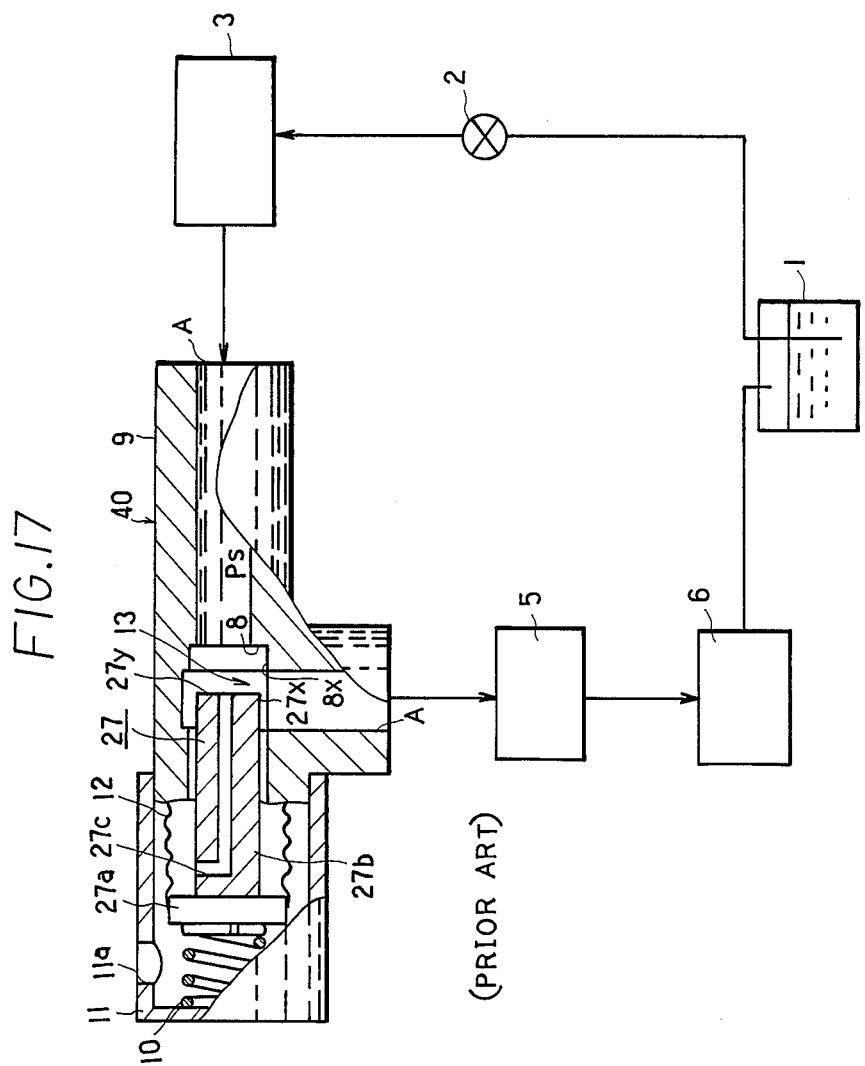
FIG. 17 shows a conventional pressure control valve assembly shown in partial cross section and an air conditioning system in which said assembly is incorporated.
Figure 18:
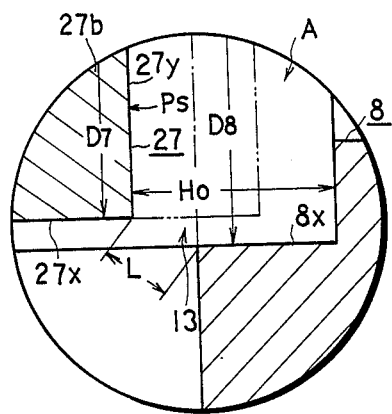
FIG. 18 is an enlarged sectional view showing the position of the plunger of FIG. 17 in its wide-open position.
Figure 19:
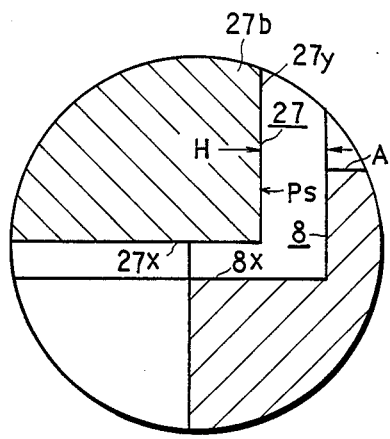
FIG. 19 is a similar view to FIG. 18, but showing the position of the plunger between its wide-open and full-throttling positions.
Figure 20:
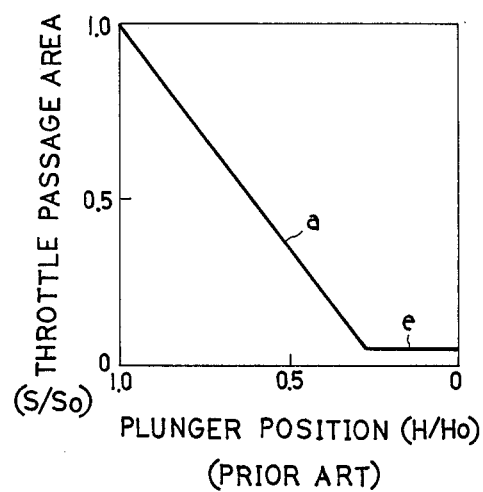
FIG. 20 is a diagram showing the variation of the throttling passage area $(S/S_o)$ with respect to the variable plunger position $(H/H_o)$ in the pressure control valve assembly of FIG. 17.
Figure 21:
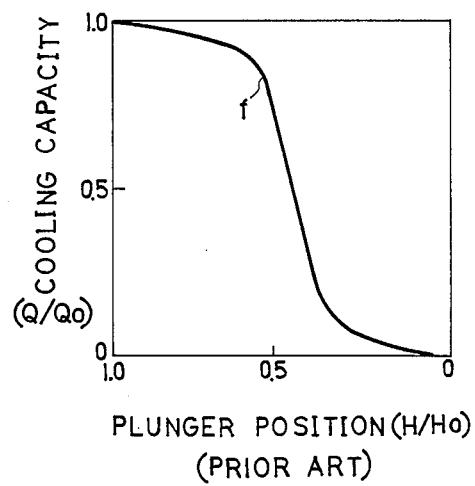
FIG. 21 is a diagram showing the variation of the cooling capacity $(Q/Q_o)$ with respect to the variable plunger position $(H/H_o)$ in the pressure control valve assembly of FIG. 17.

Referring to FIG. 1 showing a pressure control valve assembly 4 incorporated in an air conditioning system as shown in FIG. 17, it includes an elbow-shaped casing 9 having formed therein an L-shaped fluid passage A and a seat portion 8 formed at a stepped portion in the passage. The valve assembly 4 further includes a movable plunger 7 having its cylindrical body 7b slidably supported in the casing 9 with its end surface 7y in facing relation to the seat surface of the seat portion 8 so that a refrigerant gas flowing through the passage A may be throttled by the end of the movable plunger. The upstream portion of the passage A with respect to the plunger end surface 7y communicates with the outlet of an evaporator (not shown) and the downstream portion thereof communicates with the suction side of a compressor (not shown). Thus, the flow of refrigerant gas evaporated by the evaporator and moving toward the compressor is regulated by the throttling plunger 7.

The plunger 7 is enclosed at its opposite end by a cap member 11 having a bottom end and fixed over a boss portion of the casing 9. A bellows 12 is connected between the boss portion of the casing 9 and the flanged base end 7a of the plunger 7 so as to form an inner cell defined by the bellows 12 and an outer cell defined by the bellows and the cap member 11. A coil spring 10 is disposed in the outer cell between the base end 7a of the plunger 7 and the bottom end of the cap member 11 for urging the throttling plunger 7 toward the seat 8. On the periphery of the cap member 11 is provided an aperture 11a communicating with the open air so that atmospheric pressure may be applied to the outer spring cell for urging the plunger 7 in the same direction as the biasing force of the coil spring 10. A communication passage 7c is bored substantially axially through the plunger body 7b, extending between the end surface 7y and the periphery of the plunger body 7b adjacent to the base end 7a, so that the evaporating pressure $P_s$ of refrigerant gas prevailing in the upstream portion of the passage A is allowed into the inner cell and acts on the base end 7a in the direction against the combined force of the spring 10 and the atmospheric pressures.

Figure 2:
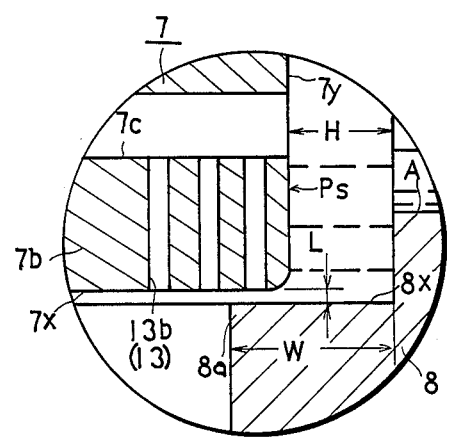
FIG. 2 is an enlarged view of the encircled portion II of FIG. 1, showing throttling passages formed in a plunger of the pressure control valve assembly.
Figure 3:
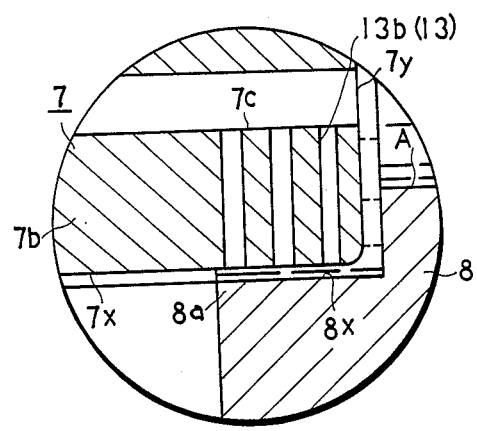
FIG. 3 is a similar view to FIG. 2, but showing the closed or full-throttling position of the plunger.

Referring then to FIG. 2, the plunger body 7b has formed in the end thereof adjacent to the end surface 7y a plurality of narrow communication passages or slits 13b extending radially downward from the axial passage 7c, each serving as part of the throttling passage 13 when communication is established therethrough. As shown clearly in FIG. 3, these narrow slits 7c are formed in such an arrangement that the one provided farthest from the end surface 7y may be positioned within the width area W (FIG. 2) of a cylindrical sealing surface 8x formed at the step of the seat portion 8 when the plunger 7 is moved to its full-throttling position where the end surface 7y is located very close to the annular seat surface of the seat portion 8. In other words, all the slits 13b can be closed by the cylindrical sealing surface 8x when the plunger 7 is position in its full-throttling position. In the illustrated embodiment, the clearance between the sealing surface 8x and the periphery of the plunger end is formed only to such an extent that lubricating oil mixed with the refrigerant may pass through this clearance for lubrication of the sliding surfaces.

Figure 4:
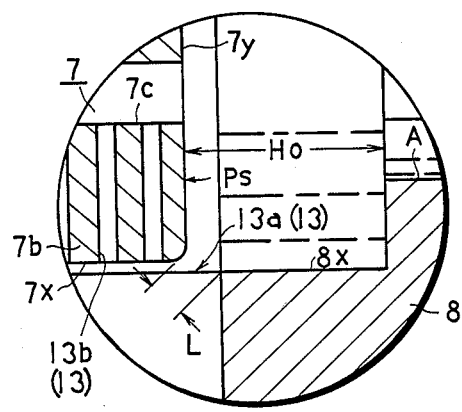
FIG. 4 is also a similar view to FIG. 2, but showing the wide-open position of the plunger.

In the wide-open position of the plunger 7 shown in FIG. 4, where its end surface 7y is cleared away from the corner edge 8a of the seat portion 8, an annular communicating passage 13a having an aperture L is formed between the plunger body 7b and the seat portion 8. This passage 13a whose aperture is variable with the plunger movement functions as part of the throttling passage 13. In this way, the throttling passage 13 in the pressure control valve assembly 4 is comprised by the above plurality of narrow slits 13b and the annular aperture 13a.

As would be now apparent from the foregoing description of the pressure control valve assembly 4 having the variable throttling passage 13 formed by the narrow slits 13b and the passage 13a, the ratio of the effective throttling area S for a given plunger position to the throttling area $S_o$ obtainable in the wide-open position of the plunger 7 can be increased progressively when the plunger 7 is moved from its closed full-throttling to wide-open positions and decreased similarly in a progressive manner during the plunger movement from its wide-open to full-throttling positions, respectively.

Though the narrow slits 13b in the plunger body 7b of the pressure control valve assembly 4 in the above-described embodiment are closed by the sealing surface 8x of the seat portion 8 in the full-throttling position of the plunger 7, it may be so arranged that part of the slits may be open to allow a slight flow of refrigerant gas therethrough in the full-throttling position of the plunger 7.

The following will describe the operation of the pressure control valve assembly 7 of the invention.

When the temperature in the space to be cooled is elevated, the pressure of the refrigerant gas issuing from the evaporator is increased with an increase of the volume of the refrigerant to be evaporated by the evaporator. Accordingly, the evaporator pressure $P_s$ prevailing in the upstream portion of the passage A and acting in the inner pressure cell in direct communication with the passage A is elevated high enough to overcome the pressure acting in opposite direction, i.e., the combined force exerted by the spring 10 and the atmospheric pressure in the outer spring cell. Therefore, the plunger 7 is moved in the direction to compress the spring 12 to a position where the pressures acting in opposing directions are counterbalanced, thus increasing the throttling area S and resulting in a drop of the evaporator pressure $P_s$.

As the cooling load is reduced, on the other hand, the evaporator pressure $P_s$ in the passage A is decreased with a decrease of the volume of the refrigerant to be evaporated by the evaporator. Accordingly, the pressure in the pressure cell is dropped and the plunger 7 is caused to move by the expanding coil spring 10 to a position where the pressures acting in opposing directions are counterbalanced, thus decreasing the throttling area S and, therefore, resulting in an increase of the evaporator pressure $P_s$.

Figure 5:
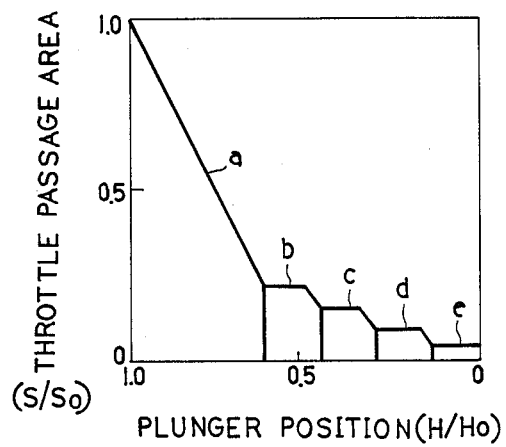
FIG. 5 is a diagram showing the variation of the throttling passage area in terms of $S/S_o$ with respect to the variable plunger position $(H/H_o)$.
Figure 7:
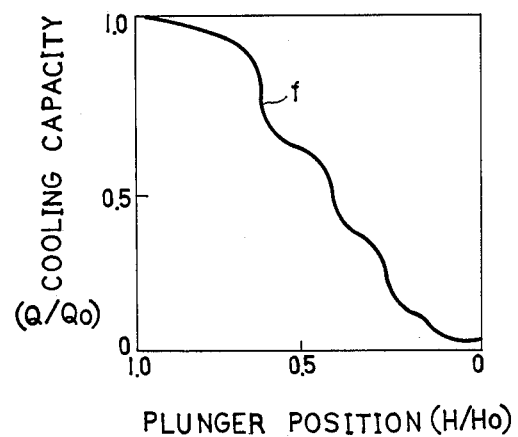
FIG. 7 is a diagram showing the variation of the cooling capacity in terms of $Q/Q_o$ with respect to the variable plunger position $(H/H_o)$.
Figure 6A:
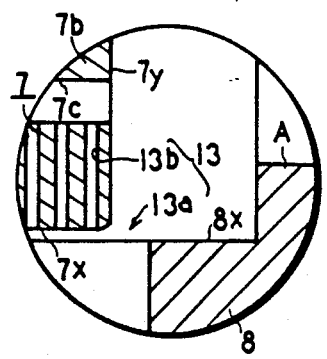
FIGS. 6($a$) to ($e$) are similar views to FIG. 2, but showing various plunger positions during the progressive movement thereof from its wide-open position (a) to full-throttling position (e)
Figure 6B:
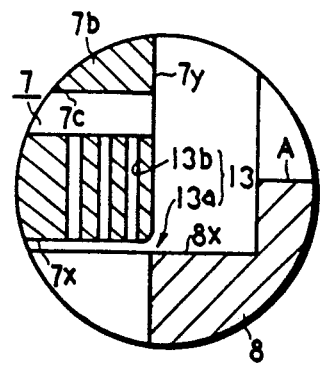
Figure 6C:
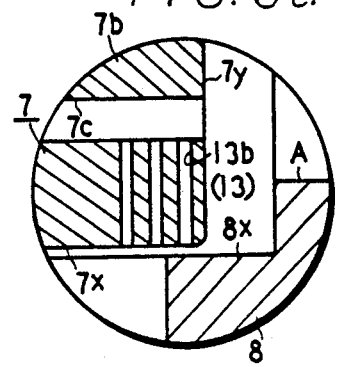
Figure 6D:
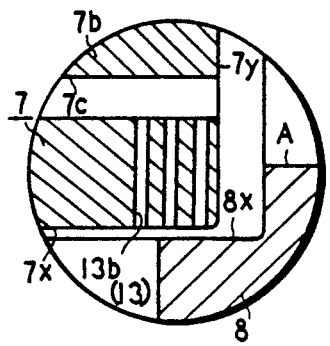
Figure 6E:
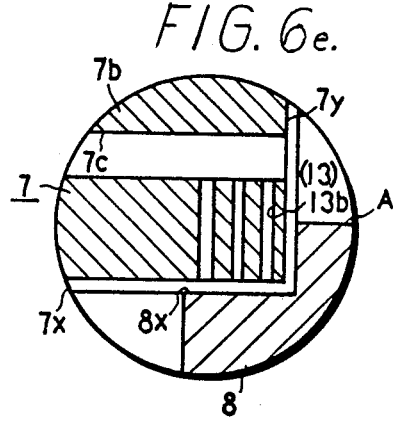

The following will describe the effect obtainable by the narrow slits 13b formed in the plunger body 7b with reference to FIG. 5 showing the variation of the ratio of the effective throttling passage area S for a given plunger position $H/H_o$ to the throttling passage area $S_o$ for the wide-open position of the plunger 7 (namely $S/S_o$), and also to FIG. 7 showing the variation of the ratio of the effective cooling capacity Q for a given plunger position $H/H_o$ to the cooling capacity $Q_o$ for the wide-open position of the plunger 7 (namely $Q/Q_o$).

Let us suppose that the plunger 7 is moved progressively from its wide-open position (a) to the closed or full-throttling position (e) of FIG. 6, or from 1.0 to 0 of plunger position $H/H_o$.

As the plunger 7 is being moved from the wide-open position (a) to the position (b) where the plunger position $H/H_o$ is about 0.6, the aperture of the throttling passage 13a is decreased to zero and the throttling passage area ratio $S/S_o$ is reduced accordingly, as indicated by line "a" in the diagram shown in FIG. 5.

Then, as the plunger 7 is being moved from the position (b) to the next position (c) where the first throttling slit 13b is closed by the sealing surface 8x of the seat portion 8, the ratio $S/S_o$ is reduced as indicated by a broken line "b" in the diagram of FIG. 5. Likewise, the ratio $S/S_o$ is decreased along broken lines "c" and "d" while the plunger 7 is being displaced from the position (c) to the position (d), and further than the position (d) but before the position "e", respectively. Line "e" where the ratio $S/S_o$ is maintained substantially constant is obtained while the plunger 7 is moved from the position where the last slit 13b is closed by the sealing surface 8x to the closed position shown by (e) of FIG. 6.

Thus, the throttling passage area ratio $S/S_o$ is dropped in a linear manner until the plunger position $H/H_o$ is decreased to about 0.6, and thereafter dropped at a moderate rate as indicated by the broken lines. Consequently, the pressure control valve assembly 4 can operate stably without causing harmful chattering, and the evaporator pressure $P_s$ can be varied moderately, accordingly.

Therefore, the cooling capacity ratio $Q/Q_o$ is reduced at a moderate and smooth rate, as indicated by a curved line "f" in the diagram of FIG. 7, in conjunction with the plunger movement from 1.0 to 0 position.

When the plunger 7 is displaced from the closed position to the wide-open position, the cooling capacity ratio $Q/Q_o$ will be increased substantially along the curved line "f" of FIG. 7.

It is to be understood that the present invention is not limited to the above-described specific embodiment, but it may be provided in various changes and modifications without departing from the spirit of the invention. The following will describe some of such changes in accordance with the invention while referring to FIGS. 8 through 16.

Figure 8:
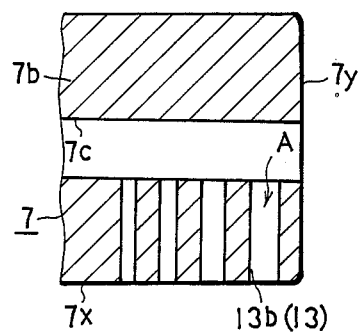
FIGS. 8 through 15 are partial enlarged views, each showing a modified form of the throttling passages formed in the plunger.

(1) The throttling slits may be provided with different sizes in cross section and hence with different throttling passage areas. FIG. 8 shows a modification of the plunger body wherein the slits 13b are provided with progressively increasing sizes toward the end surface 7y of the plunger 7b. With the use of such a plunger, the throttling passage area ratio $(S/S_o)$ can be changed more moderately in the range where the ratio $H/H_o$ is larger.

Figure 9:
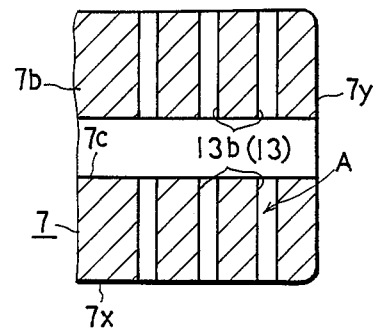

(2) FIG. 9 shows an embodiment wherein the slits 13b are formed in the plunger body 7b radially not only downward but also upward from the axial passage 7c.

Figure 10:
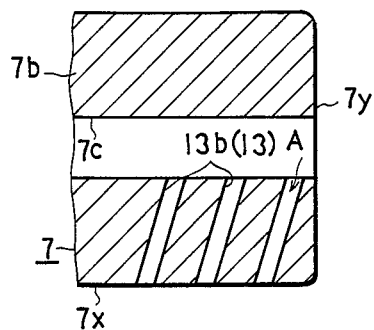

(3) FIG. 10 exemplifies an embodiment wherein the slits 13b are formed with an inclination.

Figure 11:
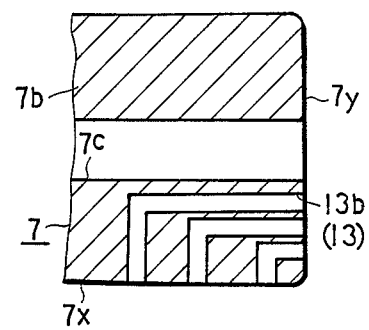

(4) The slits 13b of FIG. 11 are formed in L-shaped passages, each extending axially from the lower part of the end surface 7y of the plunger body 7b and then radially to the cylindrical periphery 7x thereof.

Figure 12:
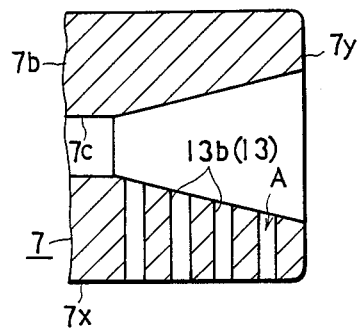
Figure 13:
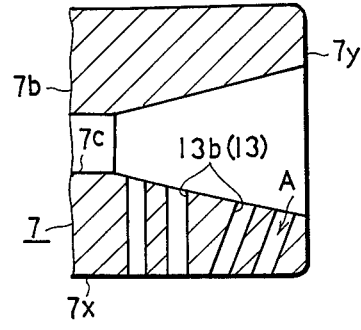
Figure 15:
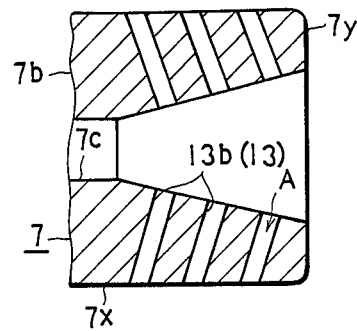

(5) In the embodiment shown in FIG. 12, the axial passage 7c bored in the plunger body 7b is formed partially divergent toward the end surface 7y and similarly directed slits 13b are formed extending downward from the divergent portion of the passage 7c. FIG. 13 shows a divergent axial passage 7c similar to that of FIG. 12, but having part of the throttling slits 13b formed with an inclination. FIG. 15 shows a divergent passage 7c also similar to that of FIG. 12, but the slits 13b are formed extending both downward and upward from the passage 7c with inclinations.

Figure 14:
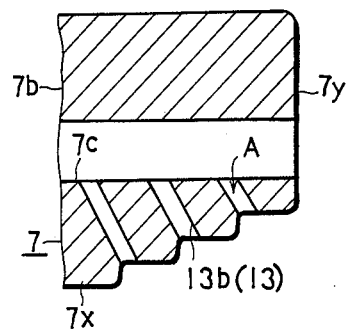

(6) FIG. 14 shows a modified form of the plunger body 7b, according to which part of the periphery thereof adjacent to its end surface 7y is stepped and the slits 13b are provided extending downward from the passage 7c with an inclination.

Figure 16:
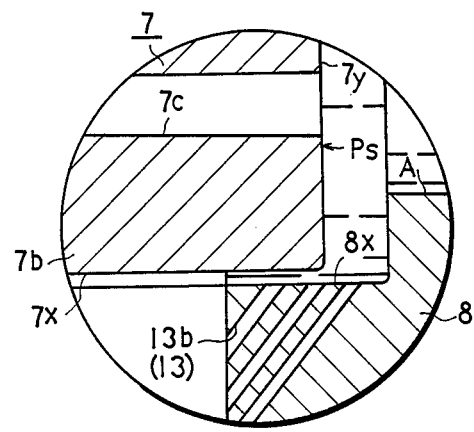
FIG. 16 is a partial enlarged view showing a form of throttling passages formed in the valve seat.

(7) FIG. 16 shows a further modified embodiment, wherein a plurality of throttling slits 13b are formed between the sealing surface 8x and its adjoining surface which is exposed to the downstream portion of the refrigerant passage A.

While the invention has been described and illustrated specifically with reference to the desired embodiment, it is to be understood that the invention can be changed or modified in other various ways without departing from the spirit or scope thereof.

What is claimed is:

1. A pressure control valve assembly incorporated in an air conditioning system having an evaporator connected at its inlet to a receiver by way of an expansion valve, and a refrigerant compressor having the suction side connected to the outlet of said evaporator and the discharge side connected to a condenser which is in turn connected to said receiver, said pressure control valve being mounted to respond automatically to changes in differences between atmospheric pressure and pressure of refrigerant gas for regulating flow of such gas and comprising:
   a casing having formed therein a fluid passage communicating between said outlet of the evaporator and said suction side of the compressor for allowing refrigerant gas from said evaporator to pass therethrough;
   slidably movable plunger means supported for simple translational motion in said casing and having one end thereof received in said fluid passage;
   seat means formed in said casing and cooperating with said plunger means to form variable-area throttling passage means in said fluid passage for regulating the flow of the refrigerant gas passing therethrough, said plunger means being movable between its wide-open position where maximum flow of the refrigerant gas is allowed through said fluid passage and its full-throttling position where minimum flow of the refrigerant gas is allowed;
   a plurality of narrow passages forming part of said variable-area throttling passage means and arranged in such a way that at least part of said narrow passages may be closed successively with the movement of said plunger means toward said full-throttling position relative to said seat means.

2. A pressure control valve assembly according to claim 1, wherein said plurality of narrow passages are formed in said movable plunger means so as to be closed successively by said seat means in the simple translational movement of said plunger means toward said full-throttling position relative to said seat means.

3. A pressure control valve assembly according to claim 2, wherein said movable plunger means has an axial passage bored therein and communicating directly with the upstream portion of said fluid passage with respect to said plunger means and said plurality of narrow passages are formed extending from said axial passage to the periphery of said plunger means.

4. A pressure control valve assembly according to claim 3, wherein at least some of said narrow passages are formed with respectively different cross-sectional area.

5. A pressure control valve assembly according to claim 3, wherein part of said axial passage adjacent to said one end is formed in a tapered shape having an increasing diameter toward the tip of said one end and said narrow passages are formed extending from the region of said tapered shape to the periphery of said plunger means.

6. A pressure control valve according to claim 1, wherein said plurality of narrow passages are formed in said seat means so as to be closed successively by said plunger means in the movement of said plunger means toward said full-throttling position relative to said seat means.

* * * * *